(12) United States Patent
Bhagat

(10) Patent No.: US 8,487,545 B2
(45) Date of Patent: Jul. 16, 2013

(54) APPARATUS FOR THE CONTROL OF LIGHTING AND ASSOCIATED METHODS

(76) Inventor: Peter Bhagat, Elsworth (GB)

( * ) Notice: Subject to any disclaimer, the term of this patent is extended or adjusted under 35 U.S.C. 154(b) by 1344 days.

(21) Appl. No.: 11/464,166

(22) PCT Filed: Feb. 11, 2005

(86) PCT No.: PCT/GB2005/000492
§ 371 (c)(1),
(2), (4) Date: Oct. 2, 2008

(87) PCT Pub. No.: WO2005/079121
PCT Pub. Date: Aug. 25, 2005

(65) Prior Publication Data
US 2009/0021187 A1 Jan. 22, 2009

(30) Foreign Application Priority Data

Feb. 11, 2004 (GB) .................................. 0402974.0

(51) Int. Cl.
*H05B 37/02* (2006.01)
(52) U.S. Cl.
USPC .............................. 315/291; 315/307; 315/308
(58) Field of Classification Search
USPC .................. 315/185 R, 209 R, 224, 291, 307, 315/308, 361
See application file for complete search history.

(56) References Cited

U.S. PATENT DOCUMENTS

| | | | |
|---|---|---|---|
| 5,459,328 A | | 10/1995 | Kadota et al. |
| 6,153,985 A | * | 11/2000 | Grossman ..................... 315/291 |
| 6,396,466 B1 | | 5/2002 | Pross et al. |
| 6,400,101 B1 | * | 6/2002 | Biebl et al. .................... 315/291 |
| 6,448,716 B1 | * | 9/2002 | Hutchison ..................... 315/129 |
| 6,583,573 B2 | * | 6/2003 | Bierman ........................ 315/149 |
| 2004/0080273 A1 | | 4/2004 | Ito et al. | |
| 2006/0071614 A1 | | 4/2006 | Tripahti et al. | |

FOREIGN PATENT DOCUMENTS

| | | |
|---|---|---|
| DE | 19841490 A1 | 3/2003 |
| EP | 0955619 A | 11/1999 |
| EP | 0966183 A | 12/1999 |
| EP | 1006759 A | 6/2000 |

(Continued)

OTHER PUBLICATIONS

Texas Instruments Inc., Datasheet—TLC5905 LED Driver, SLLS401-Nov. 1999.

(Continued)

*Primary Examiner* — Jimmy Vu
(74) *Attorney, Agent, or Firm* — David W. Carstens; Jeffrey G. Degenfelder; Carstens & Cahoon, LLP

(57) ABSTRACT

A lighting controller arranged to drive one or more light emitting semiconductors, the controller comprising a current source and/or a voltage source and a current and/or voltage sensor wherein the controller is arranged to drive the or each light emitting semiconductor using a substantially constant current or voltage and further arranged to either monitor the actual current passing through the light emitting semiconductor and the controller being arranged to monitor the voltage such that the disconnection or occurrence of faults within the or each light emitting semiconductor can be detected; or monitor the actual voltage across the light emitting semiconductor and the controller being arranged to monitor the current such that the disconnection or occurrence of faults within the or each light emitting semiconductor can be detected.

38 Claims, 2 Drawing Sheets

FOREIGN PATENT DOCUMENTS

| | | |
|---|---|---|
| EP | 1079667 A | 2/2001 |
| GB | 2224374 A | 5/1990 |
| JP | 02306678 A | 12/1990 |
| JP | 2000168432 A | 6/2000 |
| JP | 2002141605 A | 5/2002 |
| JP | 2003504797 T | 2/2003 |
| JP | 11027655 A | 7/2007 |
| WO | 9849872 A | 11/1998 |
| WO | 03061347 A | 7/2003 |
| WO | 2004/057924 A | 7/2004 |
| WO | WO2006/037363 A1 | 4/2006 |

OTHER PUBLICATIONS

Allegro Microsystems Inc., AN29503.1, Constant Current LED Drivers, Rev. 2.

Analog Devices, Inc., Datesheet—AD8240 LED Driver/Monitor, Rev. 0.

* cited by examiner

APPARATUS FOR THE CONTROL OF LIGHTING AND ASSOCIATED METHODS

FIELD OF THE INVENTION

This invention relates to an apparatus for the control of light emitting semiconductors lighting and associated methods and in particular, but not exclusively, to LED lighting.

BACKGROUND OF THE INVENTION

It will be appreciated that forms of light emitting semiconductor, other than LED's, are available. It is however convenient to refer to LED's as the elements that provide light and in the following description reference to LED's should be taken to include light emitting semiconductors. LED'S are well known and with the advent of new LED's it is now possible to replace standard white light with LED equivalents. The longevity and cost saving advantages of this will be readily apparent to the person skilled in the art.

It is known to control LED's using voltage control. However there are problems with such voltage control. For example, a small variation in voltage will result in a large variation in output intensity. For example a 0.1% change in input voltage can result in the output intensity increasing by 10%. Also, as LED's age, the intensity will change.

As LED's warm up, their impedance goes down. When driven by a constant voltage, the current goes up, resulting in more energy being put into the LED's resulting in more warming.

It is difficult to provide intensity control of lighting when driving it using a voltage supply, because it is difficult to predict what the LED intensity will be at any voltage. At low intensities, the variation of intensity with temperature will be large.

There may be problems with the forward voltage specifications of LED's, particularly white LED's. LED manufacturers normally specify a maximum forward voltage but not a minimum. This is because they are always trying to reduce the forward voltage and most applications that use LED's are not concerned with precise control. However, a low forward voltage can be a problem in LED lighting because it means that if a voltage supply is used, the current flowing through the LED's increases resulting in reducing lifetime.

For example if a lighting unit of 6 LED's in series is being used at 100% intensity and one LED has a reduced forward voltage of 0.1V, then the whole string will be overdriven by 5%.

White LED's are worse than other colours. Some lighting manufacturers have issued warnings about the lifetimes of white LED lights.

SUMMARY OF THE INVENTION

According to a first aspect of the invention there is provided a lighting controller arranged to drive one or more LED's, the controller comprising a current source and a voltage sensor wherein the controller is arranged to be connected to one or more LED's and to initially drive the or each LED with an initial current and to sense the resulting voltage, the controller being further arranged, if the resulting voltage is below a predetermined level, to increase the initial current, and in which the controller is arranged to repeat these steps until the resulting voltage substantially equals the predetermined level.

An advantage of such an invention is that it drives the LED's with a constant current rather than a voltage and thus many of the problems associated with the prior art may be reduced or overcome. Further, stepping up the initial current is advantageous because it helps to allow an LED to be correctly driven once connected to the controller without damage thereto.

A further advantage of current driving is that driving LED's with a constant current reduces the problems of the light intensity changing with age. When LED's warm up, but are driven by a constant current, the voltage goes down, so less energy is put into the LED's helping to prevent thermal run away.

Further, the problem of reliability in white LED's may be reduced. For a light with 12 LED's arranged in two parallel strings of 6 LED's in series the problem is halved. For a light of 6 LED's in series the problem is solved completely, because the current passing through each LED remains constant. It will be appreciated that a string of LED's comprises a plurality of LED's connected in series.

With current control, the overdriving parameters can be more closely controlled; potentially allowing higher levels of overdriving, while still maintaining or improving reliability.

The controller may be arranged to control a plurality of LED's arranged as a lamp.

It will be appreciated that the controller will generally be used to control lighting comprising a plurality of LED's. However, it should be appreciated that the controller could be used to drive lighting comprising a single LED.

According to a second aspect of the invention there is provided a method of controlling at least one LED comprising:
  i. driving the or each LED with an initial current and sensing the resulting voltage;
  ii. if the resulting voltage is below a predetermined level increasing the current used to drive the each LED; and
  iii. repeating steps ii. and iii. until the resulting voltage equals the predetermined level.

According to a third aspect of the invention there is provided a method where one or more LED's are driven with a voltage substantially equal to the rated voltage of the or each LED comprising measuring the current flowing through the or each LED, using the measured current as the rated current for the or each LED and thereafter driving the or each LED from a current source with the rated current.

Such an arrangement is advantageous because it provides the advantages of driving the or each LED from a current source although they are driven with a voltage equal to the rated voltage.

According to a fourth aspect of the invention there is provided a machine readable medium containing instructions which when read by a machine cause that machine to function as the controller of the first aspect of the invention.

According to a fifth aspect of the invention there is provided a machine readable medium containing instructions which when read by a machine cause the machine to perform the method of the second aspect of the invention.

According to a sixth aspect of the invention there is provided a lighting controller arranged to drive one or more LED's, the controller comprising a current source and/or a voltage source and a current and/or voltage sensor wherein the controller is arranged to drive the or each LED using a substantially constant current or voltage and further arranged to either
  i: monitor the actual current passing through the LED and the controller being arranged to monitor the voltage such that the disconnection or occurrence of faults within the or each LED can be detected; or ii: monitor the actual voltage across the LED and the controller being arranged to monitor the current such that the disconnection or occurrence of faults within the or each LED can be detected.

The controller may be arranged to detect any of the following, non-exhaustive, list of faults: detect disconnected LED's; Detect short circuit; Sense ageing in LED's; Sense overheating LED's; Sense abnormal conditions; Notify user of fault. If a plurality of LED's are connected to the controller then the controller may be arranged to notify a user of any of the above faults occurring in at least one of the LED's connected to the controller. The controller may be able to determine how many LED's are at fault or disconnected therefrom.

Generally such fault detection is automatic. Such fault detection can help to improve protection for lighting systems and lowers risk for the customer. It can be used to prevent further damage to lighting (i.e. LED's) or to degrade operation to keep it within safe levels.

If the current through the or each LED drops to substantially nothing or voltage across the or each LED rises to substantially the maximum the circuit will allow it may be determined the LED has become disconnected. This may be because the user has disconnected the LED or because a wiring fault has occurred.

If the current is constant but the voltage drops near to 0V then it may be determined that a short circuit has occurred.

If the current varies over a short time (perhaps 1 hour) then it may be that at least one LED is getting too hot and thermal run away has occurred or is occurring.

If the current or voltage varies over a long time (perhaps 500 hours operation), this may be used to indicate ageing of at least one LED.

These errors may be important to engineers as they can be used to detect faults immediately and to predict future faults.

These errors may be communicated via any suitable medium as will be appreciated by the person skilled in the art. For example the errors may be communicated as any of the following non-exhaustive list: as a digital signal, audible sound, visible signal or RS232 (or other bus protocol) message.

According to a seventh aspect of the invention there is provided a method of controlling one or more LED's comprising driving the or each LED with a substantially constant current or voltage and monitoring a parameter associated with the or each LED and comparing the parameter with a reference to determine whether a fault is present in the or each LED wherein if the or each LED is a driven with a substantially constant current the parameter is the voltage across the or each LED and if the or each LED is driven with a substantially constant voltage the parameter is the current passing through the or each LED.

The method may allow failure of any one LED controlled by the controller even when a plurality of LED's are controlled. The plurality of LED's may be connected in parallel, in series or in a combination of both parallel and series.

According to an eighth aspect of the invention there is provided a machine readable medium containing instructions which when read onto a machine cause that machine to perform as the machine of the fifth aspect of the invention.

According to a ninth aspect of the invention there is provided a machine readable medium containing instructions which when read onto a machine cause that machine to perform the method of the sixth aspect of the invention.

The controllers of the first and sixth aspects of the invention may each or both have any of the following optional features:

Current and/or voltage detection of LED's controlled by the controller may be performed by applying short pulses to the or each LED. A pulse may be on the order of microseconds, milliseconds, thousandths of a second, hundredths of a second, tenths of a second or seconds but needs only to be long enough to measure the resultant current and voltage. However, in a preferred embodiment the pulses are of a duration of roughly 1 ms.

The controller may be arranged to detect the disconnection of the or each LED. The controller may be arranged to detect disconnection of one or more LED's from within a plurality of LED's connected to the controller.

Preferably the controller may be arranged to detect failure and/or degradation any one of the or each LED. In some embodiments the controller is arranged to measure the voltage across the or each LED and/or the current flowing through the or each LED and to compare these measurements to an initial value for that LED. Changes in the measurement from the initial value would generally indicate that that the or each LED, or group of LED's has aged or is degrading.

The controller may be arranged to take the initial value for an LED, or group of LED's as it is connected to the controller. In alternative, or additional, embodiment the controller may be arranged to use a value that is input for an LED, group of LED's.

The controller may be arranged to measure the current through the or each LED, or plurality of LED's on a periodic basis. The period may be roughly any of the following values: constantly, on the order of milliseconds, on the order of tenths of a second, on the order of seconds, on the order of minutes, on the order of hours. In a typical arrangement the controller is arranged to measure the current through the or each LED, or plurality of LED's, on the order of tenths of a second.

The controller may be arranged to detect aging of the or each LED. It will be appreciated that since LED's age relatively slowly, it may be appropriate to measure the current and/or voltage, in order to determine ageing of the or each LED, or plurality of LED's, on the order of once per hour.

The controller may be arranged to control strings of LED's (groups of LED's in series).

The controller may be arranged to control multiple strings of LED's, either with regulation of each string individually or all strings as a whole.

The controller may be arranged to use light intensity feedback for regulation and determination of ageing of the or each LED. The light intensity measurement can be used to adjust the voltage and/or current in the or each LED in order to maintain constant intensity.

The controller may be arranged to monitor both the forward voltage across the or each LED and the current flowing through the or each LED. The controller may be arranged to detect changes in the forward voltage of on the order of roughly any of the following percentages: 1, 2, 3, 4 or 5.

The controller may be arranged to use a dynamically adjustable switch mode power supply or voltage converter (which may be thought of as a switch circuit) to reduce the supply voltage to reduce heat dissipation in analogue regulation of voltage and current supplies. Analogue regulation gives smoother output and faster control of constant current or voltage, but dissipates more heat. The amount of heat generated is proportional to the current flowing and the voltage dropped across the analogue regulation. A switch mode supply generates less heat and so can be used to drop the initial voltage to a level just above the voltage required by the or each LED's and then supply this voltage to the analogue regulation. Thus the voltage dropped by the analogue regulation is reduced and less heat is generated.

The controller may be arranged to monitor the voltage across the analogue regulation and may be further arranged to adjust the output voltage of any switch mode power supply or voltage converter to keep the voltage across the analogue regulation at a low and approximately constant value. Such an arrangement tends to reduce the heat dissipation through the analogue regulation, allowing more efficient use of power, lower running temperature, smaller components or less heatsink to be required.

The controller may be used in any of following non-exhaustive list of situations: domestic LED lighting; commercial LED lighting; industrial LED lighting; machine vision LED lighting. Other types of electrical device which are controlled by the amount of current flowing through them.

The methods of any of the second, third or seventh aspects of the invention may employ steps provided by any of the optional apparatus features.

The machine readable medium of any of the following aspects of the invention may comprise any of the following non-exhaustive list: a floppy disk, a CD-ROM or RAM, a DVD ROM/RAM (including +R/+RW and −R/−RW), a hard drive, a memory, any form of magneto optical storage, a transmitted signal (including an Internet download or the like), a wire, or any other suitable medium.

BRIEF DESCRIPTION OF THE DRAWINGS

There now follows by way of example only a detailed description of the present invention with reference to the accompanying drawings in which.

DETAILED DESCRIPTION OF THE DRAWINGS

In the following description, for ease of reference, reference is made to LED's. It will however be appreciated by the skilled person that embodiments of the invention may be suitable for controlling any form of semiconductor light emitting device. Examples of other semiconductor light emitting devices include the LUMILED™ available from Luxeon.

Figure 1:
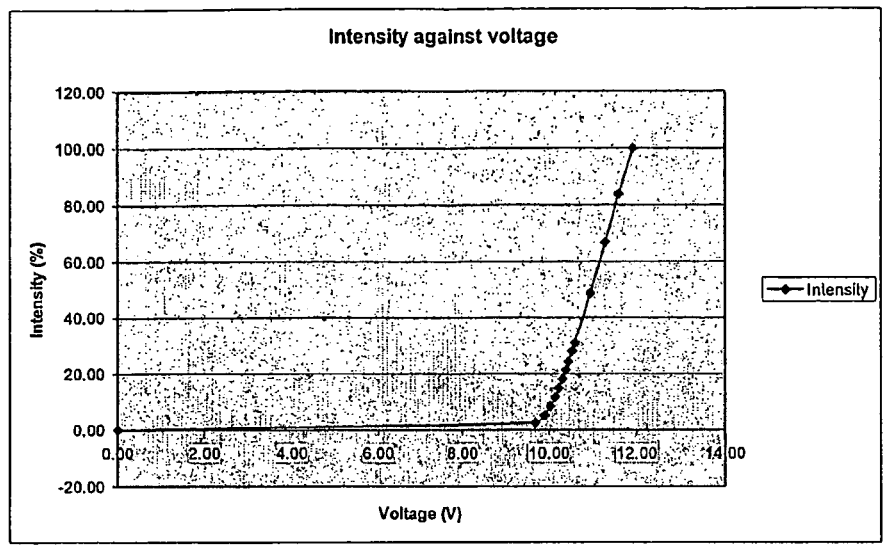
FIG. 1 shows a graph of light intensity output from an LED vs. voltage applied to the LED.

FIG. 1 shows a lighting controller comprising a microcontroller 300. The controller also comprises a variable constant current driver 302 in series with a load resistor 304. A differential amplifier 306 is connected across the load resistor 304 and is used to measure the current flowing through the load resistor 304. The output of the amplifier 306 is applied to an analogue input of the micro-controller (ADC_ACTUAL_CURRENT). It will be appreciated that the term lighting controller is intended to refer to a controller for LED lighting but it is convenient to refer to the LED's or LED being driven by the controller as lighting.

The opposite end of the load resistor 304 from the current source is connected to a further analogue input of the microcontroller 300 and allows the microcontroller 300 to measure the voltage of this point (ADC_LOAD_VOLTAGE).

A first switch 308 and a second switch 310 are both connected in series with the resistor 304 and current source 302. The first switch is used to drive a 24v connector 314 and the second switch 310 is used to drive a 12v connector 312. Each of the switches can be controlled by an output of the microcontroller (SWITCH12; SWITCH24). A further output of the microcontroller (CONTROL) is used to control the current output by the variable constant current source 302.

The microcontroller 300 switches between the 12V and 24V light connector using signals SWITCH12 and SWITCH24. Only one switch is closed at any one time.

Lighting 316 is connected to one or other of the two connectors 312, 314. Although the lighting 316 could comprise a single LED it will generally comprise a plurality of LED's providing a lamp, or the like.

The microcontroller 300 can control what current is driven through the lighting using the CONTROL analog output to control the current source 302. The current flowing through the lighting can be measured using the ADC—ACTUAL—CURRENT analog input and the voltage across the load can be measured using ADC—LOAD—VOLTAGE. Thus the microcontroller 300 can detect parameters associated with one or more LED's 316 connected to the connectors 312,314. The parameter may be either or both of the current flowing through the or each LED.

In the embodiment shown it will be appreciated that the current/voltage measured by the controller is the current through or the voltage across any single or plurality of LED's connected to either one of the connectors. Thus, if a plurality of LED's is connected to one of the connectors 312,314 then the current through or voltage across and individual LED will not be known. However, the microcontroller will generally be able to measure the current/voltage with sufficient accuracy to detect a fault within any one of the LED's within the plurality and control the voltage/current accordingly.

The lighting controller of the current embodiment allows both forward voltage across the lighting and the current flowing through the lighting to be monitored. Further it comprises a variable constant current drive, is able to measure lighting unit voltage, measure actual output current and switch between various connectors (12 and 24v in this example).

The controller is able to detect voltage rating from which connector is used and an example of voltage determination by using different connectors for different voltage ratings is as follows. Firstly, the second switch 310 (SWITCH12) is turned on with an output from the microcontroller 300 and then a small current is driven through the 12V connector. If a current is detected, then there is a 12V lighting unit connected. If no current flows then SWITCH12 is turned off and SWITCH24 (i.e. the first switch 308) is turned on with an output from the microcontroller 300. A current is then driven through the 24V connector to detect a 24V lighting unit. If still no current flows, then there is no lighting unit connected and an error is indicated. This method can be easily extended to multiple connectors and voltages.

A method as now described is used by embodiments of the current invention to determine an appropriate current with which to drive the lighting connected to one of the connectors 312,314. An advantage of such a method is that the lighting is driven within safe limits. A summary of the method may be briefly made as follows: drive with short pulses; drive a small current and measure the voltage; increase the current until the rated voltage is reached. Once the appropriate current has been determined the controller may continue to drive the lighting with a pulses (which is perhaps the preferred embodiment) or may drive the lighting with a constant or substantially constant current.

First the voltage rating of the LED's is determined. This may be by some form of user input, by using different connectors for differently rated LED lighting (as described above) or some other method.

This method is safe as the lighting is driven within its rated limits. There are also additional safeguards.

In one embodiment of the method the lighting is pulsed with a small current. This current can be as little as 10 mA, which is well below the current rating of an LED. The voltage across the lighting unit during the pulse is measured. If the voltage is below the rated voltage, then the current is increased slightly and the lights pulsed again. The current is increased until the rated voltage for the lighting unit is reached. An example of a C source code is provided in Appendix A for providing this method. The skilled person will be able to appreciate many more details about the method from the algorithm.

Embodiments of the current invention may also be able to detect ageing and overheating of LED's controlled by the controller. As LED lighting heats up, the effective impedance goes down. Thus with a constant voltage source the current goes up, or with a constant current source the required voltage goes down. By measuring the current when using a constant voltage source or by measuring the voltage across the lighting when using a constant current source, this effect can be used to detect that lighting is overheating.

When using a constant current source, the expected forward voltage of the lighting is determined. This could be from a known rating for the lighting, or could be auto-detected in some way, for example by measuring the forward voltage at the operating current when the lighting is not hot. When the lighting is in use, the forward voltage of the lighting is regularly measured. If the voltage falls below a preset value, the lighting is deemed to be overheating and appropriate action can be taken; i.e. the current is reduced; the lighting turned off or the like.

When using a constant voltage source, the expected current of the lighting is determined. This could be from a known rating for the lighting, or could be auto-detected in some way, for example by measuring the current at the operating voltage when the lighting is not hot. When the lighting is in use, the current supplied to the lighting is regularly measured. If the current rises about a preset value, the lighting is deemed to be overheating and appropriate action can be taken.

If lighting is deemed to be overheating, the appropriate action may be to turn the light off to prevent damage, reduce the amount of power applied to the lights or to alert an operator.

The same technique can be used to monitor for ageing in LED's. As LED's age, their impedance may increase or decrease over a period of hundreds or may be thousands of hours of operating time.

In the embodiment being described the current rating of the lighting connected to the controller is calculated at any of the following times: on power up; when requested by user; when a new light is detected; and periodically during operation.

Embodiments of the invention may be arranged to detect when lighting is connected or disconnected. When lighting is disconnected, the controller can remove the output current or reduce it to a small value. The controller can then automatically detect when new lighting has been connected and automatically sense the current rating for the new lighting.

Alternatively, or additionally, a mechanism can be provided for a user to request the current rating is sensed. As a safety feature, the controller may disable high power output until the current sensing has been completed.

Embodiments of the invention may employ various safeguards for current sensing to help ensure that the method is as safe for the LED's as possible. The safe guards may be any of the following non-exhaustive list: use current control to prevent accidental overdriving; only pulse for a short time; reduce heat effects; apply limits on currents/voltages supplied; check for shorts and open circuit (limits on the impedance).

Such safeguards can help when an abnormal condition occurs.

The sensing output uses current control to prevent accidental overdriving of the lighting.

The output may be pulsed, not continuous, to ensure that the lighting unit is only on for short periods. This also reduces the problem of the lighting becoming warm, which will affect its performance.

Predetermined limits may be applied to the allowed voltage and current that are output. If these are exceeded, then the operation may be stopped and an error generated or other appropriate action taken The method measures the impedance of the load and checks that it is within limits. This detects short circuits and open circuits, which can cause a high current or voltage to occur.

In summary of the above the following may be salient points:
Voltage Control
 Less stable than current control
 Variation with age
 Thermal run away
 Less reliable with white LED's
 Limited safe overdriving
 Difficult or impossible to have repeatable intensity control
 Controlling LED's by maintaining a constant voltage is not as stable as maintaining a constant current.
Reliability of White LED's
 Maximum forward voltage is specified
 Minimum forward voltage is not specified
 Reduced lifetime and uneven lighting
Current Control
 LED's are current devices
 More stable light output if current driven
 Less variation with age
 Reduced problem with white LED's
 Controlled overdriving
 Repeatable intensity control
 Intensity control is easier with current control when compared to voltage control. Even variations in temperature have a small effect on the output intensity.

Figure 2:
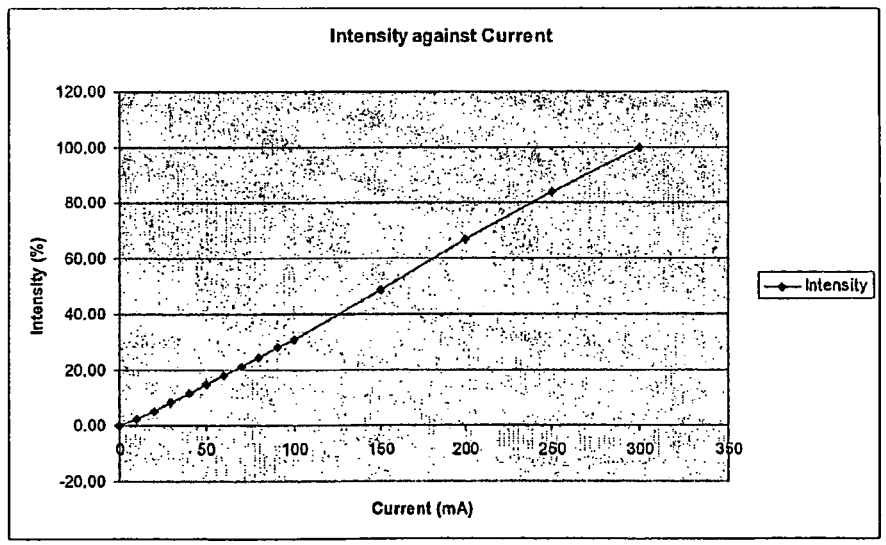
FIG. 2 shows a graph of light intensity output from and LED vs. current applied to an LED.
Figure 3:
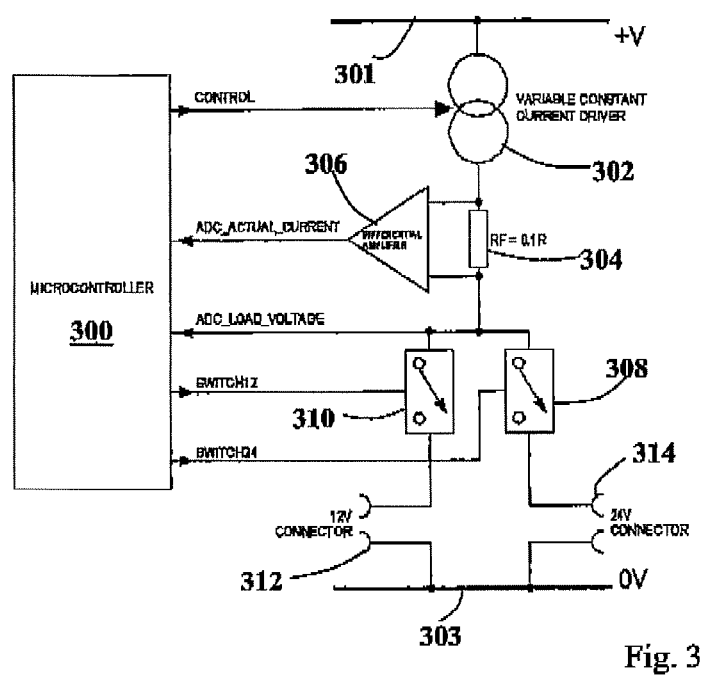
FIG. 3 shows a circuit diagram providing an example of a circuit used in one embodiment of the present invention.

The graphs in FIGS. 1 and 2 show the intensity from a lighting plotted against supply voltage and supply current. From FIG. 1, it is obvious that the voltage curve is non-linear. Although it is linear in the upper region, the start point for this region is dependent on temperature, so it is difficult/impossible to design a voltage controller giving accurate or repeatable intensity control. FIG. 2 shows how current has a near linear relationship with intensity, allowing repeatable intensity control, even with some temperature variation.
Current Sensing
 Enables voltage specified lights to be driven using constant current control
 Enables proper intensity control
 Enables controlled overdriving We have established that driving LED's using a constant current supply is beneficial. However some LED lighting manufacturers have a problem in that the entire range of products is defined by the voltage to drive them. Embodiments of the current invention may overcome this problem as they provide a way of detecting what the current rating is for lighting driven by a controller.

This would enable a lighting controller to be produced which drives LED's with constant current even if the lighting is specified with a voltage rating.

APPENDIX A

```
//****************************************************************
//
// Function:        CurrentSense
//
// Parameters:          pfCurrentRating
//                      pfVoltageRating
//
// Result:          TRUE if current sensing is successful
//
// Assumes that a lighting unit is connected.
//
// Detect whether the lighting unit is rated at 12V or 24V
//
// Start at 10mA and increase the current until the voltage
// across the lighting unit reaches the rated voltage. The current
// needed to do this is the current rating for the lighting.
//
// The lights are pulsed for a short time to ensure that an
// abnormal condition does not cause the lights to be damaged
//
// Detected fault conditions:
//      There is no light connected
//      The lighting unit is short circuit
//      The lighting unit requires too much current
//      The current flowing is not the expected current
//
//****************************************************************
#define     SENSE_MIN_CURRENT   (0.01F)         // Minimum current sensed in amps
#define     SENSE_MAX_CURRENT   (0.5F)          // Maximum allowed current in amps
#define     SENSE_STEP_CURRENT  (0.001F)        // Step size in amps
bool CurrentSense(float * pfCurrentRating, float * pfVoltageRating)
{
    //***************************************************
    // Auto variables
    float   fCurrent;                   // The expected current
    float   fSupplyVoltage;             //     The voltage rating of the lighting
    float   fActualCurrent;             // The measured current
    float fActualVoltage;               //     The measured lighting unit voltage
    //***************************************************
    // Detect whether the 12V or 24V connector is being used
    // by setting a very low current and switching each connector on
    // in turn and measuring whether a current is flowing
    SetCurrent(SENSE_MIN_CURRENT);          // Set a low current
    // Try 12V connector
    SetOutputConnector(SWITCH_12V)
    if ( OutputCurrent( ) > SENSE_MIN_CURRENT / 2 )
    (
        fSupplyVoltage = 12;                // 12V unit detected
    }
    else
    {
        // Try 24V connector
        SetOutputConnector(SWITCH_24V)
        if ( OutputCurrent( ) > SENSE_MIN_CURRENT / 2 )
        {
            fSupplyVoltage = 24;            // 24V unit detected
        }
        else
        {
            // No lighting unit detected
            SetCurrent(0);
            SetOutputConnector(SWITCH_NONE);
            return FALSE;
        }
    }
    SetCurrent(0);                          // Turn current off
    //***************************************************
    // Do current detect
    // Increase the output current from the minimum to maximum
    // until the voltage across the lighting unit reaches the rated voltage.
    for ( fCurrent = SENSE_MIN_CURRENT; ; fCurrent += SENSE_STEP_CURRENT )
    {
        // Pulse the light on at the expected current and measure
        SetCurrent(fCurrent);               // Set the expected current
        fActualCurrent = OutputCurrent( );  //      Measure the actual current
```

APPENDIX A-continued

```
        fActualVoltage = LoadVoltage( );              //     Measure the actual
voltage
        SetCurrent(0);                                // Turn the current off
        // Error testing here (removed for clarity):
        // Check that the actual current is within 10% of expected
        // Check that the lighting unit is not short circuit
        // Check whether the rated voltage has been reached
        if ( fActualVoltage >= fSupplyVoltage )
        {
            // Reached target voltage rating
            SetOutputConnector(SWITCH_NONE);
            break;
        }
        // Check for end of loop
        if ( fCurrent >= SENSE_MAX_CURRENT )
        {
            // Error. Light needs more than the maximum allowed current
            // to reach the voltage rating
            SetOutputConnector(SWITCH_NONE);
            return FALSE;
        }
    }
}
//*******************************************************
    // Return results
    *pfCurrentRating = fCurrent;
    *pfVoltageRating = fSupplyVoltage;
    return TRUE;
}
```

The invention claimed is:

1. A lighting controller arranged to drive lighting comprising one or more light emitting semiconductors, the controller comprising;
a current source and/or a voltage source and;
a current and/or voltage sensor;
wherein the controller is arranged to drive the lighting using a substantially constant current or voltage and further arranged to either
i: monitor an actual current passing through the lighting and the controller being arranged to monitor a voltage such that the disconnection of or occurrence of faults in at least one light emitting semiconductor within the lighting is detected; or
ii: monitor an actual voltage across the lighting and the controller being arranged to monitor a current such that the disconnection of or occurrence of faults in at least one light emitting semiconductor within the lighting is detected; and
wherein the controller is arranged to use light intensity feedback to determine ageing of at least one of the light emitting semiconductors within the lighting.

2. The controller according to claim 1 which is arranged to control lighting comprising a plurality of light emitting semiconductors that are arranged in at least one series connected string of light emitting semiconductors.

3. The controller according to claim 2 which is arranged to control lighting comprising a plurality of strings of light emitting semiconductors.

4. The controller according to claim 3 which is capable of controlling the strings of light emitting semiconductors either individually, in groups or all strings as a whole.

5. The controller according to claim 1 which is arranged to supply the current to the lighting by applying pulses to the lighting.

6. The controller according to claim 5 in which the pulses are on the order of roughly any of the following lengths: microseconds, milliseconds, thousandths of a second, hundredths or a second, tenths of a second or seconds.

7. The controller according to claim 5 in which is arranged to generate pulses roughly 1 ms in length.

8. The controller according to claim 1 in which the controller is arranged to drive current through the lighting and measure the resultant voltage across the lighting.

9. The controller according to claim 8 in which the controller is arranged to drive the lighting at an initial current, sense the voltage across the lighting and to subsequently ramp up the current until the voltage across the lighting reaches a predetermined level.

10. The controller according to claim 1 in which the controller is arranged to apply a voltage across the lighting and measure the resultant current through the lighting.

11. The controller according to claim 1 which is arranged to detect the disconnection of at least one light emitting semiconductor within the lighting.

12. The controller according to claim 11 which is arranged to continue to attempt to supply a current, which is nominal, to any light emitting semiconductor that it determines has been disconnected.

13. The controller according claim 1 which is arranged to detect failure and/or degradation of at least one of the light emitting semiconductors within the lighting.

14. The controller according to claim 13 which is arranged to detect failure and/or degradation of the at least one of the light emitting semiconductors by measuring the voltage across the lighting and/or the current through the lighting and comparing the current and/or voltage to an initial value for that lighting.

15. The controller according to claim 1 which is arranged to perform one of increasing the voltage across the lighting and increasing the current through the lighting in order to maintain the light output of the lighting at a substantially constant level.

16. The controller according to claim 1 which is arranged to use light intensity feedback for regulation of the lighting.

17. The controller according to claim 16 in which the controller is arranged to drive current through the lighting and/or apply a voltage across the lighting and measure the resultant light intensity output by the lighting.

18. The controller according to claim 1 which is arranged to use a light intensity measurement to adjust the voltage across and/or current in the lighting in order to maintain constant intensity.

19. The controller according to claim 1 which is arranged to monitor both the forward voltage across each light emitting semiconductor and the current flowing through the one or more light emitting semiconductors.

20. The controller according to claim 1 which comprises a dynamically adjustable switch mode power supply or voltage converter.

21. The controller according to claim 1 which is arranged to detect overheating of at least one of the light emitting semiconductors within the lighting.

22. The controller according to claim 21 in which the controller is arranged to monitor the forward voltage of at least one of the light emitting semiconductors in order to detect overheating therein.

23. The controller according to claim 1 in which the light emitting semiconductor is an LED.

24. The controller according to claim 1 in combination with lighting comprising a plurality of light emitting semiconductors controlled thereby.

25. The combination according to claim 24 in which the plurality of light emitting semiconductors provide a lamp or other light emitting semiconductor light source.

26. The combination according to claim 24 in which the light emitting semiconductors are LEDs.

27. A lighting controller arranged to drive lighting comprising one or more light emitting semiconductors, the controller comprising;
   a current source and/or a voltage source and;
   a current and/or voltage sensor;
   wherein the controller is arranged to drive the lighting using a substantially constant current or voltage and further arranged to either
   i: monitor an actual current passing through the lighting and the controller being arranged to monitor a voltage such that the disconnection of or occurrence of faults in at least one light emitting semiconductor within the lighting is detected; or
   ii: monitor an actual voltage across the lighting and the controller being arranged to monitor a current such that the disconnection of or occurrence of faults in at least one light emitting semiconductor within the lighting is detected; and
   wherein the controller is arranged to monitor the impedance of the lighting over a period and further arranged to use a change of impedance to determine ageing of the one or more light emitting semiconductors within the lighting.

28. The controller according to claim 27 in which the period is of the order of hundreds or thousands of hours.

29. The lighting controller according to claim 27 in which the lighting controller is arranged to drive current through the lighting and measure the resultant voltage across the lighting.

30. The lighting controller according to claim 29 in which the lighting controller is arranged to drive the lighting at an initial current, sense the voltage across the lighting and to subsequently ramp up the current until the voltage across the lighting reaches a predetermined level.

31. A method of controlling lighting comprising one or more light emitting semiconductors comprising:
   using a controller for:
   driving the lighting with a substantially constant current or voltage;
   monitoring a parameter associated with the lighting; and
   comparing the parameter with a reference to determine whether a fault is present in at least one light emitting semiconductor wherein if the lighting is driven with a substantially constant current the parameter is the voltage across the lighting and if the lighting is driven with a substantially constant voltage the parameter is the current passing through the lighting;
   wherein the controller is arranged to use light intensity feedback to determine ageing of at least one of the light emitting semiconductors within the lighting.

32. The method according to claim 31 wherein the plurality of light emitting semiconductors are connected in parallel, in series or in a combination of both parallel and series.

33. The method according to claim 31 which drives the lighting by applying a series of pulses.

34. The method according to claim 33 in which the pulses are of roughly 1 ms.

35. The method according to claim 31 which controls lighting comprising one or more LEDs.

36. A machine readable medium containing instructions which when read onto a machine cause that machine to provide the method of claim 31.

37. A controller arranged to drive an electrical device that emits light, the controller comprising:
   a current source and/or a voltage source and a current and/or voltage sensor;
   wherein the controller is arranged to drive the electrical device using a current or voltage and further arranged to either
   i) monitor the actual current passing through the electrical device and the controller being arranged to monitor the voltage such that the disconnection of or occurrence of faults in the electrical device is detected; or
   ii) monitor the actual voltage across the electrical device and the controller being arranged to monitor the current such that the disconnection of or occurrence of faults on the electrical device is detected; and
   wherein the controller is arranged to use light intensity feedback to determine ageing of the electrical device.

38. A computer programmable medium containing a program which when executed causes a lighting controller to:
   drive lighting connected to the controller with a substantially constant current or voltage;
   monitor a parameter associated with the lighting; and
   compare the parameter with a reference to determine whether a fault is present in at least one light emitting semiconductor;
   wherein the parameter is the voltage across the lighting when the lighting is driven with a substantially constant current and the parameter is the current passing through the lighting when the lighting is driven with a substantially constant voltage; and
   wherein the controller is arranged to use light intensity feedback to determine ageing of a light emitting semiconductor within the lighting.

* * * * *